United States Patent [19]

Bugnon et al.

[11] Patent Number: 5,282,897
[45] Date of Patent: Feb. 1, 1994

[54] PROCESS FOR IMPROVING STORAGE STABILITY OF PIGMENTS

[75] Inventors: Phillipe Bugnon, Essert, Switzerland; Abul Iqbal, Arconciel, both of; Iain F. Fraser, Kilbirnie; Wern T. Tsai, Glasgow, both of Scotland

[73] Assignee: Ciba-Geigy Corporation, Ardsley, N.Y.

[21] Appl. No.: 928,826

[22] Filed: Aug. 11, 1992

[30] Foreign Application Priority Data

Aug. 16, 1991 [GB] United Kingdom ................ 9117766

[51] Int. Cl.⁵ ................................ C09C 1/36
[52] U.S. Cl. .................... 106/437; 106/450; 106/481; 106/499
[58] Field of Search ............. 106/437, 499, 450, 481

[56] References Cited

U.S. PATENT DOCUMENTS 4,880,472 11/1989 Bugnon et al. ............ 106/493
4,889,562 12/1989 Bugnon et al. ............ 106/204
5,017,231 5/1991 Nishihara et al. ............ 106/452

FOREIGN PATENT DOCUMENTS 254861 2/1988 European Pat. Off.
1519685 8/1978 United Kingdom.
1537986 1/1979 United Kingdom.

OTHER PUBLICATIONS

Derw. Abst. 73-765530.
Derw. Abst. 87-299965.

Primary Examiner—Karl Group
Assistant Examiner—Scott L. Hertzog
Attorney, Agent, or Firm—JoAnn Villamizar; George R. Dohmann

[57] ABSTRACT

A process for improving the storage stability of a colored organic pigment in powder form which comprises coating pigment particles with a partially or completely hydrolysed compound of an element of Group IVA or Group IVB of the Periodic Table in its IV oxidation state, thereby inhibiting reduction of the tinting strength of the pigment on storage.

20 Claims, No Drawings

PROCESS FOR IMPROVING STORAGE STABILITY OF PIGMENTS

This invention relates to a process for improving the storage stability of pigments, particularly coloured organic pigments, in powder form, and to storage stable pigment compositions.

The tinting strength of a pigment in powder form tends to decrease with increased storage time of the powder. This problem is particularly notable with monoazo pigments.

It has now been found that by forming on pigment particles a coating of a hydrolysed compound of a Group IVA or Group IVB element, storage stability and therefore retention of tinting strength of pigments in powder form can be significantly improved.

It is known from U.S. Pat. No. 4,880,472 that organic pigments can be coated with certain partially hydrolysed compounds of elements of Group IVA or IVB of the Periodic Table to improve the rheological properties of the pigments.

Accordingly, the present invention provides a process for improving the storage stability of a coloured organic pigment in powder form which comprises coating pigment particles with a partially or completely hydrolysed compound of an element of Group IVA or Group IVB of the Periodic Table in its IV oxidation state, thereby inhibiting reduction of the tinting strength of the pigment on storage.

The hydrolysed compound may be a compound of formula

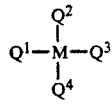

I in partially or completely hydrolysed form, where M denotes a Group IVA or Group IVB element and $Q^1$, $Q^2$, $Q^3$ and $Q^4$ each independently denote halogen, $C_1$ to $C_4$ alkoxy, $C_6$-$C_{12}$ aryloxy or a group of formula

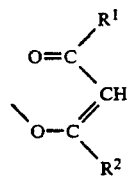

II where $R^1$ denotes methyl, ethyl, methoxy or ethoxy and $R^2$ denotes methyl or ethyl.

$Q^1$, $Q^2$, $Q^3$ and $Q^4$ may be the same or different. When one or more of $Q^1$, $Q^2$, $Q^3$ and $Q^4$ denote a $C_1$ to $C_4$ alkoxy group, this may be a methoxy, sec-butoxy or tert-butoxy group or, preferably, an ethoxy, n-propoxy, isopropoxy or n-butoxy group. When one or more of $Q^1$, $Q^2$, $Q^3$ and $Q^4$ denote halogen, this may be bromine, fluorine or, preferably, chlorine. When one or more of $Q^1$, $Q^2$, $Q^3$ and $Q^4$ denotes a $C_6$-$C_{12}$ aryloxy group, this may be phenoxy, optionally substituted by one to three alkyl groups having a total number of carbon atoms no greater than 6, or naphthyloxy.

In formula II, $R^1$ and $R^2$ preferably each denote methyl, i.e. formula II is preferably an acetylacetonate group.

In formula I, M generally denotes tin, lead, germanium, silicon, titanium or zirconium. Thus, compounds of formula I include tin (IV) chloride ($SnCl_4$), tin (IV) dichlorodiacetylacetonate (i.e. $Q^1$ and $Q^2$ are each —Cl and $Q^3$ and $Q^4$ are each an acetylacetonate group), tetraethoxy silane, titanium (IV) n-butylate (Ti-$(OCH_2CH_2CH_2CH_3)_4$), titanium (IV) isopropylate, titanium (IV) oxysulphate ($TiOSO_4$), zirconium (IV) propylate and zirconium (IV) acetylacetonate ($Q^1$, $Q^2$, $Q^3$ and $Q^4$ each denoting acetylacetonate).

Preferred compounds of formula I are those where M denotes silicon, titanium or zirconium, especially zirconium. An especially preferred compound of formula I is zirconium (IV) acetylacetonate.

The hydrolysed compound may alternatively be a partially or completely hydrolysed acetate, nitrate, sulphate, oxysulphate, oxychloride, carbonate or silicate of titanium (IV) or zirconium (IV). Aqueous solutions of compounds of zirconium (IV) such as zirconium acetate, also known as zirconyl acetate, zirconium nitrate, also known as zirconyl nitrate, and zirconium orthosulphate, also known as zirconyl sulphate, are believed to contain hydroxylated polymeric species. Preferred such hydrolysed titanium (IV) and zirconium (IV) compounds are hydrolysed titanium (IV) oxysulphate ($TiOSO_4$), zirconium (IV) oxychloride ($ZrOCl_2$) and, especially, zirconium (IV) acetate, zirconium (IV) orthosulphate and zirconium (IV) nitrate.

Hydrolysis of the compound of the Group IVA or IVB element may be carried out in situ in the medium used to effect coating of the pigment particles, when that medium is aqueous.

In a convenient procedure for the coating of the pigment particles with a hydrolysed derivative of the compound of the Group IVA or IVB element, the pigment particles and said compound, or a solution or dispersion of said compound, are mixed in an aqueous medium in which said compound is hydrolysed until the pigment particles are coated, and coated pigment particles are separated from the resulting mixture. Preferably, an aqueous dispersion of the pigment, for example obtained by redispersing a previously formed pigment presscake in water or a mixture of water with a water-miscible organic solvent, is mixed with the compound of the Group IVA or IVB element or a solution thereof in water, a water-miscible organic solvent or a mixture of water and said solvent.

The aqueous medium in which coating of the pigment particles may be carried out can be acidic or alkaline, depending on the nature of the compound of the Group IVA or IVB element. For example, titanium (IV) compounds may be hydrolysed readily in acidic or alkaline media, while alkaline media are usually preferred for hydrolysis of zirconium (IV) compounds. In order to achieve the required pH level, a water-soluble acid or base can be added to the aqueous medium. Suitable such bases are alkali metal hydroxides and carbonates, conveniently added as aqueous solutions. Suitable acids include mineral acids such as hydrochloric and sulphuric acids, conveniently as dilute aqueous solutions.

The compound of the Group IVA or IVB element is used generally in an amount of 0.1 to 15%, preferably 0.5 to 5%, calculated as the oxide of the element, by weight of the pigment.

The hydrolysed compound coated on the pigment particles may be crosslinked by reaction with a crosslinking agent therefor. This reaction is conveniently carried out in the aqueous medium in which coating of the pigment particles is effected before separation of the coated particles from the medium, although it could be carried out by treating the coated pigment particles with the crosslinking agent after such separation, for example in another solvent or mixture of solvents. It is believed that crosslinking occurs through reaction of the agent with hydroxyl groups formed on hydrolysis of the compound of the Group IVA or IVB element.

Suitable crosslinking agents include boron oxyacids and their salts, for example boric acids such as orthoboric acid, metaboric acid and polyboric acids and their salts, usually alkali metal salts, and boronic acids, usually alkaneboronic acids such as methaneboronic and ethaneboronic acid, arylboronic acids such as phenylboronic acid, and their salts; phosphoric acids, such as orthophosphoric acid, and their salts, usually alkali metal salts; aliphatic and aromatic aldehydes such as formaldehyde, acetaldehyde, propionaldehyde, n-butyraldehyde, isobutyraldehyde, n-valeraldehyde, n-caproaldehyde, n-heptaldehyde, glyoxal, succinic dialdehyde, glutaric dialdehyde, adipic dialdehyde and benzaldehyde; carboxylic acids and their halides or salts, usually di(acid halides) of dicarboxylic acids such as oxalic acid, malonic acid, succinic acid, glutaric acid, adipic acid, tetrahydrophthalic acid, hexahydrophthalic acid and phthalic acid; alkylene dihalides, usually $C_1$ to $C_6$ alkylene such as methylene-, ethylene-, ethylidene-, trimethylene-, tetramethylene-, pentamethylene- and hexamethylene dihalides, usually dibromides or, preferably, dichlorides; aluminium salts such as aluminium nitrate, aluminium sulphate, sodium aluminium sulphate or potassium aluminium sulphate; and polyisocyanates, usually diisocyanates such as 1,2-propylene-,1,4-butylene-, pentamethylene-, hexamethylene dihalides, usually dibromides or, preferably, dichlorides; aluminium salts such as aluminium nitrate, aluminium sulphate, sodium aluminium sulphate or potassium aluminium sulphate; and polyisocyanates, usually diisocyanates such as 1,2-propylene-, 1,4-butylene-, pentamethylene-, hexamethylene-, dodecamethylene-, 1,4-cyclohexylene-, and methyl-2,4-cyclohexylene diisocyanates, 3-isocyanatomethyl-3,5,5-trimethylcyclohexyl isocyanate (isophorone diisocyanate), 2,4-and 2,6-tolylene diisocyanates and 4,4$^1$-diphenylmethanediisocyanate.

Other suitable crosslinking agents are alkoxides of elements of Group IVA or Group IVB of the Periodic Table, usually tetra-alkoxides of tin, lead, germanium or, preferably, of silicon, titanium or zirconium in which the alkyl groups preferably each have 1 to 4 carbon atoms, for example as in methyl, sec-butyl or tert-butyl groups or, especially, ethyl, n-propyl, isopropyl or n-butyl groups, and inorganic compounds of tin, titanium and zirconium such as $ZrOCl_2$, $TiOSO_4$ and $SnCl_4$, provided that the crosslinking agent is different from the compound used for the formation of the hydrolysed coating on the pigment.

Further suitable crosslinking agents are silicates which form "active" silica or aluminates which form alumina. The formation of active silica from silicates is described in U.S. Pat. Nos. 3,370,971 and 3,639,133. Preferably, silicic acid, metasilicates or, particularly, commercial sodium silicate are used as the source of active silica. Suitable aluminates are water-soluble aluminates such as sodium, potassium and magnesium aluminates.

Also suitable as crosslinking agents are alkoxysilyl-substituted alkyl esters of acrylic acid and methacrylic acid, usually trialkoxysilyl-substituted $C_1$ to $C_6$ alkyl esters of acrylic or methacrylic acid in which the alkoxy groups preferably each have 1 to 4 carbon atoms, such as trimethoxysilylmethyl acrylate, 2-(trimethoxysilyl)ethyl methacrylate, 2-(triethoxysilyl)ethyl methacrylate and 3-(trimethoxysilyl)propyl methacrylate.

Preferred crosslinking agents include boric acids and their salts, preferably sodium and potassium salts, especially orthoboric acid and sodium tetraborate; phosphoric acids and their salts, especially sodium orthophosphate; silicates, especially sodium silicate, together with an acid, preferably sulphuric acid; and trialkoxysilyl-substituted $C_1$ to $C_6$ alkyl esters of acrylic acid or methacrylic acid in which the alkoxy groups each have 1 to 4 carbon atoms, especially 3-(trimethoxysilyl)propyl methacrylate.

In a convenient method of effecting crosslinking of the coating of the hydrolysed compound on the coated pigment, the crosslinking agent or a solution thereof in water, a water-miscible organic solvent or mixture thereof is mixed with an aqueous dispersion of pigment coated with the hydrolysed compound and, after crosslinking, pigment particles having a crosslinked coating are separated from the resulting reaction mixture. The aqueous dispersion of the coated pigment is preferably that produced by mixing the compound of the Group IVA or Group IVB element, or a solution or dispersion thereof, with an aqueous dispersion of the pigment until pigment particles are coated as hereinbefore described, i.e. crosslinking is preferably effected in the aqueous medium in which coating is carried out before the coated pigment particles are separated from that medium.

In general, the crosslinking agent may be used in an amount of 0.01 to 1.5 mol, preferably 0.05 to 0.5 mol, per mol of compound of the Group IVA or IVB element. When an active silica-forming or alumina-forming agent is used, it is added in an amount usually from 0.5 to 50, preferably 1 to 25, especially 2 to 15%, by weight of the pigment.

The aqueous medium in which crosslinking is carried out usually has a pH of 5 to 10, more usually from 7 to 10. The pH is usually controlled by the addition of a water-soluble base to the aqueous medium. Such bases include alkali metal hydroxides and carbonates, conveniently added as aqueous solutions. When an active silica-forming silicate is used as crosslinking agent, the pH of the aqueous dispersion of coated pigment is usually adjusted to 7–10 by addition of a base and the silicate is added slowly together with hydrolysing acid, while the pH is maintained above 7.

The reaction mixture may be heated to effect crosslinking, for example to a temperature up to 95° C., preferably 60°–95° C. The crosslinking reaction time may be, for example, from 0.1 to 8 hours; in general, reaction is sufficiently complete within 0.2 to 2 hours. The pigment particles having a crosslinked coating can be separated from the reaction mixture by filtration, washed, stored as presscake if desired and then dried to give a coated pigment powder.

Powder compositions comprising particles of a coloured organic pigment coated with a hydrolysed compound as hereinbefore described crosslinked by a boron oxyacid or salt thereof, by a phosphoric acid or salt thereof, or by an alkoxysilyl-substituted alkyl ester of acrylic acid or methacrylic acid, are novel. Accordingly, the present invention also provides a particulate composition comprising particles of a coloured organic pigment coated with a hydrolysed compound as hereinbefore defined crosslinked by a boron oxyacid or a salt thereof, by a phosphoric acid or salt thereof, or by an alkoxysilyl-substituted alkyl ester of acrylic acid or methacrylic acid, as hereinbefore described.

The present invention further provides particulate compositions comprising particles of a coloured organic pigment having a crosslinked coating of a partially or completely hydrolysed acetate, nitrate, sulphate, oxysulphate, oxychloride, carbonate or silicate of titanium (IV) or zirconium (IV). The coating may be crosslinked as hereinbefore described, preferably by a preferred crosslinking agent as hereinbefore described.

In the method and composition of the invention, the pigment may be, for example, a monoazo pigment, a diazo pigment, a phthalocyanine, a quinacridone, an indanthrone, a flavanthrone, a pyranthrone, a perylene, a thioindigo, a dioxazine, a perinone, an isoindoline, an isoindolinone, a diketopyrrolopyrrole, a basic dye complex or a metal complex. The invention is particularly useful where the pigment is a monoazo pigment, for example an arylamide pigment of formula

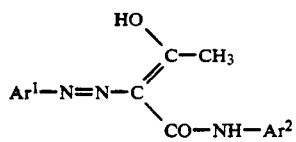

III where $Ar^1$ denotes a phenyl group substituted by one or two substituents selected from $C_1$ to $C_4$ alkyl (preferably methyl), halogen (preferably chlorine), nitro or $C_1$ to $C_4$ alkoxy (preferably methoxy) and $Ar^2$ denotes a phenyl group which is unsubstituted or substituted by one or two substituents selected from $C_1$-$C_4$ alkoxy (preferably methoxy) and halogen (preferably chlorine); or a pigment of formula

IV where $Ar^1$ is as hereinbefore defined and $Ar^3$ denotes a 2-hydroxynaphthyl group which may be further substituted by a group —$CONHAr^2$ where $Ar^2$ is as hereinbefore defined. Such pigments include C.I. Pigments Yellow 1, Yellow 3, Yellow 4, Yellow 5, Yellow 73, Yellow 98, Yellow 111 and, especially, Yellow 74; and C.I. Pigments Red 3, Red 12 and, especially, Orange 5. The invention is also particularly useful where the pigment is a basic dye complex such as C.I. Pigment Violet 3.

Various co-additives may be used together with a pigment treated according to the invention in pigment compositions. Examples of such co-additives, which are generally used in a total amount of 1 to 50% by weight of the total pigment composition, include surfactants, resins and long chain fatty acids and amines. Surfactants used may be of the anionic type, such as fatty acid taurides, fatty acid N-methyltaurides, fatty acid isothionates, alkylbenzenesulphonates, alkylnaphthalenesulphonates, alkylphenol polyglycol ether sulphates and fatty alcohol polyglycol ether sulphates; fatty acids, such as palmitic, stearic and oleic acids; soaps such as alkali metal salts of fatty acids and naphthenic acids; cationic surfactants include quaternary ammonium salts, and N-oxides of tertiary amines or salts thereof; non-ionic surfactants include fatty alcohol polyglycol ethers (ethoxylated fatty alcohols), fatty acid polyglycol esters, alkylphenol polyglycol ethers and dialkyl polyglycol ethers. Resins include wood rosin, hydrogenated wood rosin, and polyamide resins e.g. those produced by condensing phthalic anhydride with long chain amines. Amines which may be added include long chain primary amines e.g. stearylamine; amine derivatives of wood rosin; N-long chain alkylalkylene diamines; polyamines; beta-amines, polyamide/polyamine derivates of ethoxylated fatty amines and diamines, and derivatives of these compounds.

The present invention also provides a high molecular weight material pigmented with a pigment treated by the method of the invention as hereinbefore described, including material pigmented with novel particulate compositions as hereinbefore described. High molecular weight materials which may be pigmented with a pigment treated in accordance with the invention include cellulose ethers and esters such as ethylcellulose, nitrocellulose, cellulose acetate and cellulose butyrate, aminoplasts such as urea-formaldehyde and melamine-formaldehyde resins, alkyd resins, phenoplasts, polycarbonates, polyolefines, polystyrenes, polyvinyl chlorides, polyamides, polyurethanes, polyesters, rubbers, casein and silicones. These high molecular weight materials may be in the form of solids or liquids, for example in compositions for the production of moulded plastics, or in solution, for example in spinning solutions, varnishes, paints and printing inks. The coated pigments produced by the method of the invention are generally incorporated in an amount of 0.01 to 30%, preferably 0.1 to 15%, by weight of the high molecular weight material.

The improved storage stability which can be achieved by the present invention is particularly useful for pigments to be used with high molecular weight materials such as alkyd resins in surface coating compositions such as paints or printing inks.

The invention is illustrated by the following Examples, in which parts and percentages are by weight unless otherwise indicated.

EXAMPLE 1

C.I. Pigment Yellow 74 aqueous presscake (33% solids) (182 g) is re-dispersed in water (400 ml) in a conventional manner. To the aqueous suspension obtained is added solid zirconium acetylacetonate (9.6 g) (=4% $ZrO_2$, based on pigment) and the mixture is stirred for 16 hours at room temperature. The temperature of the mixture is increased to 80° C. and held for 1 hour, then the pH of the mixture is raised to 8.0 using dilute aqueous sodium hydroxide. Sodium tetraborate (3.49 g, 0.5 mol per mol of zirconium acetylacetonate) is added and the mixture is stirred at 80° C. for 2 hours. The coated pigment is isolated by filtration, washed with water and kept as presscake. The product is dried at 65° C. just prior to testing. The product thus obtained is found to have improved powder storage stability compared with the untreated pigment (see Table 1).

EXAMPLE 2

C.I. Pigment Yellow 74 aqueous presscake (33% solids) (182 g) is re-dispersed in water (700 ml) in a conventional manner. To the aqueous suspension obtained is added solid zirconium acetylacetonate (9.6 g) (=4% $ZrO_2$, based on pigment) and the mixture is stirred for 2 hours. The temperature of the mixture is increased to 75° C. and the pH of the mixture is raised to 8.5 using dilute aqueous sodium hydroxide. After stirring the mixture at 75° C. for 1 hour, a solution of sodium silicate (30% $SiO_2$) (3.99 g) (=2% $SiO_2$ based on pigment) diluted with water (100 ml) is added slowly with the simultaneous addition of dilute sulphuric acid to maintain a pH of 8.5-9.0. When the addition is complete, the temperature is increased to 90° C. and the mixture is stirred at this temperature for 90 minutes. After cooling to 70° C., the coated pigment is isolated by filtration, washed with water and kept as presscake. The product is dried at 65° C. just prior to testing. The product thus obtained is found to have improved powder storage stability compared with the untreated pigment (see Table 1).

EXAMPLE 3

C.I. Pigment Yellow 74 aqueous presscake (33% solids) (182 g) is re-dispersed in water (400 ml) in a conventional manner. To the aqueous suspension obtained is added solid zirconium acetylacetonate (9.6 g) (=4% $ZrO_2$, based on pigment) and the mixture is stirred for 18 hours. The temperature of the mixture is then increased to 85° C. and the pH is increased to 8.5 using dilute aqueous sodium hydroxide. The mixture is stirred at 85° C. for 90 minutes and the temperature is then reduced to 80° C. A solution of 3-(trimethoxysilyl)-propyl methacrylate (1.26 g) in isopropanol (60 ml) is added. The temperature is once again increased to 85° C. and stirring is continued for 75 minutes. After cooling to 70° C., the coated pigment is isolated by filtration, washed with water and kept as presscake. The product is dried at 65° C. just prior to testing. The product thus obtained is found to have improved powder storage stability compared with the untreated pigment (see Table 1).

EXAMPLE 4

To C.I. Pigment Yellow 74 aqueous slurry (4.7% pigment) (17.6 kg) is added a solution of zirconium nitrate (46 g) dissolved in water (1 liter) (=2% $ZrO_2$, based on pigment).

The mixture obtained is stirred for 15 minutes and heated at 80°-85° C. for 1 hour. The pH of the mixture is increased to 8.2 by addition of dilute aqueous NaOH. A solution of sodium tetraborate (24 g) in water (1 liter) is added and the mixture is maintained at 80°-85° C. for 1 hour. After cooling to 70° C., the coated pigment is isolated by filtration, washed with water and dried at 68° C. in an oven. The dried product is sieved and tested and found to have improved powder storage stability compared with the untreated pigment (see Table 2).

EXAMPLE 5

CI Pigment Yellow 74 aqueous presscake (26% solids) (270 g) is redispersed in water (500 ml) in a conventional manner. To the aqueous suspension obtained is added a solution of zirconium acetate (2.8 g) (=4% $ZrO_2$, based on pigment) in water (50 g) and the mixture is stirred and boiled at 99° C. for 15 mins. A solution of sodium orthophosphate (1.4 g) in water (50 g) is added and the mixture is boiled at 99° C. for a further 15 mins and then cooled to 70° C. The coated pigment is isolated by filtration, washed with water and dried at 70° C. The dried product is sieved, tested and found to have improved powder storage stability (see Table 3).

EXAMPLE 6

C.I. Pigment Yellow 74 aqueous presscake (36% solids) (167 g) is redispersed in water (500 ml) in a conventional manner. To the aqueous suspension obtained is added a solution of zirconium acetylacetonate (1.2 g) (=0.5% ZrO2, based on pigment) in water (50 g) and the mixture is stirred and heated to 80° C. The pH is adjusted with dilute aqueous NaOH to 8.0. The slurry is further heated at 80° C. for 1 hour and then cooled to 70° C. The coated pigment is isolated by filtration, washed with water and dried at 70° C. The dried product is sieved, tested and found to have improved powder storage stability compared with the untreated pigment (see Table 4).

EXAMPLES 7-12

To determine the powder storage stability of pigments treated by the method of the invention, as well as the corresponding untreated pigment, the dried pigments are incorporated in a conventional manner into an alkyd paint system (SORBAL P470, an alkyd resin ex DSM Resins Ltd having a solids content of 70%, white spirit, pigment; and driers solution).

|  | MILLBASE | FINAL PAINT |
|---|---|---|
| PIGMENTATION | 20% | 10% |
| PIGMENT/BINDER | 1/1.4 | 1/4.7 |
| SOLIDS CONTENT | 35% | 54% |

The dried powders are each divided into two portions. One portion is tested in the above paint system immediately after drying. The other portion is stored at 40° C. for 1 month before the paint is prepared.

The tinting strengths are assessed visually and instrumentally using datacolour DC-3890. The results are given in Tables 1 to 4. The values correspond to the parts of pigment required to give an equal tinting strength to a defined standard. Lower values denote higher tinting strengths.

TABLE 1

| Example | Pigment | Amount of Pigment Required Initial | Amount of Pigment Required 1 Month | Loss of Strength |
|---|---|---|---|---|
| 7 | Example 1 | 82 | 82 | 0 |
| 8 | Example 2 | 90 | 93 | 3 |
| 9 | Example 3 | 80 | 83 | 3 |
| Control | C.I. Yellow 74 | 80 | 103 | 23 |

TABLE 2

| Example | Pigment | Amount of Pigment Required Initial | Amount of Pigment Required 1 Month | Loss of Strength |
|---|---|---|---|---|
| 10 | Example 4 | 87 | 93 | 6 |
| Control | C.I. Yellow 74 | 98 | 115 | 17 |

TABLE 3

| Example | Pigment | Amount of Pigment Required Initial | Amount of Pigment Required 1 Month | Loss of Strength |
|---|---|---|---|---|
| 11 | Example 5 | 90 | 95 | 5 |
| Control | C.I. Yellow 74 | 80 | 95 | 15 |

TABLE 4

| Example | Pigment | Amount of Pigment Required Initial | Amount of Pigment Required 1 Month | Loss of Strength |
|---|---|---|---|---|
| 12 | Example 6 | 78 | 80 | 2 |
| Control | C.I. Yellow 74 | 98 | 125 | 27 |

What is claimed is:

1. A process for improving the storage stability of a colored organic pigment in powder form which comprises coating pigment particles with a partially or completely hydrolysed compound of an element of Group IVA or Group IVB of the Periodic Table in its IV oxidation state, and crosslinking the coating on the pigment by treating the coating with a crosslinking agent therefor which is a boron oxyacid or a salt thereof, a phosphoric acid or a salt thereof, or an alkoxysilyl-substituted alkyl ester of acrylic or methacrylic acid, thereby inhibiting reduction of the tinting strength of the pigment on storage.

2. A process according to claim 1, which is carried out in an aqueous medium and in which hydrolysis of the compound of the Group IVA or IVB element is carried out in situ.

3. A process according to claim 1, in which coating is effected by mixing the pigment particles and said compound, or a solution or dispersion of said compound, in an aqueous medium in which said compound is hydrolysed until the pigment particles are coated, and coated pigment particles are separated from the resulting mixture.

4. A process according to claim 1, in which the crosslinking agent or a solution thereof in water, a water-miscible organic solvent or a mixture of water and said solvent is mixed with an aqueous dispersion of pigment coated with the hydrolysed compound and, after crosslinking, pigment particles having a crosslinked coating are separated from the resulting reaction mixture.

5. A process according to claim 4, in which crosslinking is effected in the aqueous medium in which coating of the pigment particles with the hydrolysed compound is carried out before the coated pigment particles are separated from the medium.

6. A process for improving the storage stability of a colored organic pigment in powder form which comprises coating pigment particles with a partially or completely hydrolysed titanium or zirconium compound which is an acetate, nitrate, sulphate, oxysulphate, oxychloride, carbonate or silicate of titanium (IV) or zirconium (IV), and crosslinking the coating by treatment with a crosslinking agent therefor, thereby inhibiting reduction of the tinting strength of the pigment on storage.

7. A process according to claim 6, which is carried out in an aqueous medium and in which hydrolysis of the titanium or zirconium compound is carried out in situ.

8. A process according to claim 6, in which coating is effected by mixing the pigment particles and the titanium or zirconium compound, or a solution or dispersion of said compound, in an aqueous medium in which said compound is hydrolysed until the pigment particles are coated, and coated pigment particles are separated from the resulting mixture.

9. A process according to claim 6, in which the crosslinking agent or a solution thereof in water, a water-miscible organic solvent or a mixture of water and said solvent is mixed with an aqueous dispersion of pigment coated with the hydrolysed compound and, after crosslinking, pigment particles having a crosslinked coating are separated from the resulting reaction mixture.

10. A process according to claim 9, in which crosslinking is effected in the aqueous medium in which coating of the pigment particles with the hydrolysed compound is carried out before the coated pigment particles are separated from the medium.

11. A particulate pigment composition comprising particles of a colored organic pigment coated with a hydrolysed compound as defined in claim 1 crosslinked by a boron oxyacid or a salt thereof, by a phosphoric acid or a salt thereof, or by an alkoxysilyl-substituted alkyl ester of acrylic acid or methacrylic acid.

12. A composition according to claim 11, in which the hydrolysed compound is a) a compound of formula

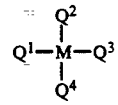

I in partially or completely hydrolysed form, where M denotes an element of Group IVA or Group IVB of the Periodic Table and $Q^1$, $Q^2$, $Q^3$ and $Q^4$ independently denote halogen, $C_1$ to $C_4$ alkoxy or $C_6$ to $C_{12}$ aryloxy or a group of formula

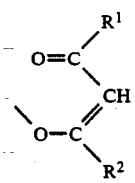

II where $R^1$ denotes methyl, ethyl, methoxy or ethoxy and $R^2$ denotes methyl or ethyl; or b) a partially or completely hydrolysed acetate, nitrate, sulphate, oxysulphate, oxychloride, carbonate or silicate of titanium (IV) or zirconium IV.

13. A composition according to claim 12, in which the hydrolysed compound is a compound of formula I in partially or completely hydrolysed form, where $Q^1$, $Q^2$, $Q^3$ and $Q^4$ each denote a group of formula II where $R^1$ and $R^2$ each denote methyl and M denotes silicon, titanium or zirconium, or the hydrolysed compound is a partially or completely hydrolysed acetate, orthosulphate or nitrate of zirconium (IV).

14. A composition according to claim 11, in which the hydrolysed compound is crosslinked by orthoboric acid, sodium tetraborate, orthophosphoric acid, sodium orthophosphate, or 3-(trimethoxysilyl)propyl methacrylate.

15. A composition according to claim 11, in which the pigment is a monoazo pigment or a basic dye complex.

16. A high molecular weight material pigmented with a composition according to claim 11.

17. A particulate pigment composition comprising particles of a colored organic pigment having a crosslinked coating of hydrolysed compound as defined in claim 6 which is a partially or completely hydrolysed acetate, nitrate, sulphate, oxysulphate, oxychloride, carbonate or silicate of titanium (IV) or zirconium (IV).

18. A composition according to claim 17, in which the pigment is a monoazo pigment or a basic dye complex.

19. A composition according to claim 17, in which the coating is crosslinked by a boric acid or a salt thereof, a phosphoric acid or a salt thereof, a silicate which forms active silica, or a trialkoxysilyl-substituted $C_1$ to $C_6$ alkyl ester of acrylic acid or methacrylic acid.

20. A high molecular weight material pigmented with a composition according to claim 17.

* * * * *